Patented Jan. 4, 1944

2,338,415

UNITED STATES PATENT OFFICE 2,338,415

PROCESS OF PREPARING GELATIN NUTRIENT PRODUCTS

Thomas B. Downey, Haddonfield, and Henry E. Williams, Mullica Hill, N. J., assignors to Kind & Knox Gelatine Company, Camden, N. J., and Charles B. Knox Gelatine Company, Johnstown, N. Y., a corporation of New York, jointly No Drawing. Application June 4, 1941, Serial No. 396,540

6 Claims. (Cl. 99—18)

This invention relates to water soluble nutrient products derived from edible gelatin and to methods of making the same.

Edible gelatin, derived from connective tissues and bones of animals, is a valuable food. However, the amounts, which may be readily consumed by the individual in salads, desserts and the like, are insufficient to have a noticeable effect. Effective amounts of gelatin cannot be readily consumed in jellies and the like since the concentration of gelatin therein is low and hence the consumption of excessive amounts of water would be required. Dry gelatin is resistant to mastication. If the gelatin is incorporated in water or juices in large concentrations, it rapidly forms a sticky, thick, mush-like mass and finally a tough jelly, both of which are difficult to consume and are obnoxious to some people. As at present consumed as a supplement to the diet, by athletes and the like, large amounts of gelatin are added to fruit juices and the like, agitated and consumed immediately before a material amount of swelling and thickening can take place. This method of taking the gelatin is inconvenient.

It is an object of our invention to provide a water soluble nutrient material from edible gelatin. Another object is to provide a method for producing a water soluble nutrient material from gelatin which material has all of the desirable nutrient value of the original gelatin and does not have any of the jelling properties of the original gelatin. A further object is to provide a water soluble non-jelling food from gelatin which is pleasing to the eye and the taste. Other objects are to provide new compositions of matter and to advance the art. Still other objects will appear hereinafter.

The above and other objects may be accomplished in accordance with our invention which comprises treating from 100 to 1200 parts of edible gelatin in a concentrated aqueous solution with about 1 part of enzyme of the group of papain and bromelin until the gelatin loses all jelling properties and then before the nitrogen, present as proteose nitrogen, is decreased below 12% of the total nitrogen and before the percent of the nitrogen, present as amino acid nitrogen, exceeds 5, terminating the action of the enzyme and then concentrating the product, preferably to a substantially dry solid. The product, as thus obtained, has all of the valuable food properties of the original gelatin, is substantially colorless and tasteless and is very soluble in cold water, fruit juices, vegetable juices and the like.

The products contain substantially all of the nitrogen of the original gelatin, generally about 14.5 to 17% nitrogen. The nitrogen in the product will be divided about 12% to about 63% as proteose nitrogen, from 0 to about 1.1% as protein nitrogen, about 5% to about 2% as amino acid nitrogen and from about 82.3% to about 33% as peptone nitrogen. The preferred product has a pH of about 4.6 to about 4.65 when dissolved in water.

By edible gelatin, we mean that of animal origin generally obtained from connective tissues and bones. The original gelatin will generally have a nitrogen content of about 16 to about 18%. The pH of the original gelatin will generally vary from about 4.3 to about 6. When papain is employed for treating the gelatin, the gelatin will preferably have a pH of from about 4.5 to about 5.0. A concentrated solution of gelatin will contain at least 20% of gelatin, that is, at least 20 parts of gelatin to 80 parts of water. Solutions containing from 20 to 50% gelatin have been satisfactorily employed. We preferably employ gelatin solutions containing 20 to about 35% of gelatin. We have found it necessary to employ such concentrated solutions of gelatin in order to avoid objectionable degradation of the product to lower molecular weight compounds and ammonia and racemization during the concentration and drying steps.

The enzymes to be employed in our process are papain and bromelin. Other enzymes split the protein differently to produce different products and require different conditions for their action, such as alkaline conditions permitting bacterial attack on the product. By papain, we means the commercial papain powder as obtained on the market. By bromelin, we mean the commercial product obtained from pineapple. The proportions employed in accordance with our invention are based upon such commercial products. Naturally, it is unnecessary to employ the commercial products, since solutions, such as the expressed juices of the fruits from which these enzymes are obtained, may be employed in equivalent amounts.

The amount of enzyme employed should be 1 part for 100 to 1200 parts of gelatin. The amounts required are limited by the speed of the action and the amount of gelatin which can be attacked by the amount of enzyme employed. It is desirable to complete the attack of the enzyme on the gelatin within a reasonably short time in order to avoid deterioration of the products formed.

The rate of attack of the enzyme on the gelatin is a function of the temperature and increases rapidly up to 160° F. Higher temperatures produce objectionable amounts of amino acids and undesirable bitter red as well as black-colored bitter products. At 160° F., heat hydrolysis causes deterioration of the desired product. At 212° F., a bitter taste is developed in 60 minutes. A bitter taste is also developed in an autoclave in 5 minutes at 15 pounds steam pressure and in 20 minutes at 5 pounds steam pressure. The process of our invention will generally be carried out at from about 120° F. to about 150° F. and preferably at about 140° F. to about 150° F.

The loss of jelling properties may be determined by cooling a sample of the reaction mix to a point where ice crystals are formed. When no jell is formed under such conditions and the sample is still fluid, the treated gelatin is considered to have lost its jelling properties and the product is considered to have no jelling properties. It generally requires only 2 to 3 minutes to make this test. When 1 part of papain was used for 150 parts of gelatin at 140° F., the gelatin lost all its jelling properties in about 30 minutes. When 1 part of papain was employed for 300 parts of gelatin at 140° F., the gelatin lost its jelling properties in about 37 minutes. When 1 part of papain was employed with 600 parts of gelatin at 140° F., the gelatin lost its jelling properties in about 90 minutes. When 1 part of papain was employed for 1200 parts of gelatin at 140° F., the gelatin lost its jelling properties in about 378 minutes.

The action of the enzyme may be terminated at any time after the gelatin has lost its jelling properties and before the proteose nitrogen is reduced to less than 12% of the total nitrogen and the amino acid nitrogen has been increased to more than 5% of the total nitrogen. Preferably, the action of the enzyme is terminated promptly after the non-jelling point is reached, that is, before any further change in the product can take place. The time available for terminating the action of the enzyme varies with the speed of attack on the gelatin.

Various methods may be employed for terminating the action of the enzyme. The action of the enzyme may be terminated by heating the reaction mixture to boiling. The action of the enzyme may be terminated by removing it from the reaction mixture as by filtration, particularly with inert filter aids such as "Filtercel," "Filtrol," "Celites" and the like either with or without decolorizing carbon. Such inert filter aids adsorb the enzyme and help to remove it during the filtration. The action of the enzyme may also be terminated by evaporation of the water and thereby depriving the enzyme of the hydrolytic medium necessary for its action. Preferably, we terminate the action of the enzyme by adding decolorizing carbon and an inert filter aid, filtering the mixture and then evaporating the mixture to dryness. In some cases, the use of a decolorizing agent and filtration are unnecessary, particularly if the gelatin solution is filtered before the addition of the enzyme and purified papain is employed as the enzyme.

The solution of the food product, obtained when the action of the enzyme has proceeded to the desired extent, may be concentrated at temperatures up to about 120° F. under vacuum and preferably at about 120° F. under a vacuum of about 26 to 28 inches. The food products of our invention are produced by concentrating the solution to at least 50% and preferably to dryness. Products of 50 to 75% concentration have proved to be satisfactory and have the approximate consistency of molasses. Preferably, the products are concentrated to 75% and then dried on a vacuum drum drier or by other suitable methods maintaining the temperature low to avoid objectionable degradation and the like.

The products of our invention are naturally of substantially the original color of the original gelatin, that is, a light straw color. Even this slight color may be objectionable to some people and a more marketable product is obtained by decolorizing it with decolorizing carbon or other decolorizing material suitable for use with edible products.

The nitrogen present as protein, proteose, amino acids and peptones, respectively, was determined in accordance with the method disclosed on pages 26 and 27 of "The Chemistry and Technology of Gelatine and Glue," by R. H. Bogue, first edition, published in 1922 by the McGraw-Hill Book Company, Inc., New York city, New York, the amino acid nitrogen being determined by the Sorenson modification of the formaldehyde-titration method on page 27. Accordingly, when we refer to protein nitrogen, proteose nitrogen, amino acid nitrogen and peptone nitrogen in this specification and in the claims, we mean the protein nitrogen, etc., as determined by such method.

In order to illustrate our invention more clearly, the preferred modes of carrying the same into effect and the results to be obtained thereby, the following examples are given:

*Example I*

Dry commercial papain powder was purified by maceration with sufficient water to break up the lumps, addition of sodium carbonate to raise the pH to 8.2, filtration of the solution and bringing the pH of the filtrate back to about 7 with an acid such as hydrochloric acid, lactic acid, citric acid, phosphoric acid and the like. This purification removed calcium, iron and aluminum compounds and aids in the subsequent filtration of the nutrient product.

The purified papain was added to a 32% solution of gelatin in water in the proportion of 1 part of the papain to 150 parts of gelatin at a temperature of 140° F. The papain was allowed to act on the gelatin at the temperature of 140° F. for 45 minutes, at the end of which time the gelatin had lost all jelling properties. Decolorizing carbon and a filter-aid, "Filtercel," were added and the solution filtered. The filtrate was evaporated to dryness at about 120° F. under a vacuum of 28 inches.

The original gelatin was derived from pigskin and contained about 10% of water and about 16% nitrogen. From 71 parts of such gelatin, we obtain 70 parts of a solid product containing 8.03% water and 16.29% nitrogen. The nitrogen in the product was divided—2.08 parts as proteose, none as protein, 0.79 part as amino acids and 13.42 parts as peptones. In other words, about 12.25% of the nitrogen was present as proteose nitrogen, about 4.85% of the nitrogen was present as amino acid nitrogen and 82.3% of the nitrogen was present as peptone nitrogen. The product readily dissolved in water, producing a solution having a pH of 4.65.

*Example II*

Purified papain, prepared as in Example I, was added to a 32% solution of gelatin in water in the ratio of 1 part of papain to 300 parts of gelatin at 140° F. The mixture was maintained at such temperature for 37 minutes, at the end of which time the gelatin had lost all its jelling properties. The resulting solution was treated as in Example I and yielded 72 parts of solid material for each 70.8 parts of the original gelatin. The original gelatin was derived from pigskin. The solid product obtained by this treatment contained 8.31% moisture and 16.06% nitrogen, which nitrogen was divided—4.37 parts as proteose nitrogen, none as protein, 0.60 part as amino acid nitrogen and 11.09 parts as peptone nitrogen. In other words, about 27.2% of the nitrogen was present as proteose nitrogen, about 3.74% was present as amino acid nitrogen and about 69% of the nitrogen was present as peptone nitrogen. The product readily dissolved in cold water to produce a solution having a pH of 4.63.

*Example III*

This example was carried out in the same way and with the same materials as Examples I and II, except that 1 part of the purified papain was employed for 600 parts of gelatin and the non-jelling stage was reached in about 90 minutes. The solid product obtained amounted to 71 parts for each 71.0 parts of gelatin treated. The product contained 7.23% water and 16.39% nitrogen. The nitrogen was divided—8.57 parts as proteose nitrogen, 0.07 part as protein nitrogen, 0.34 part as amino acid nitrogen and 7.41 parts as peptone nitrogen. In other words, about 52.3% of the nitrogen was present as proteose nitrogen, about 0.43% of the nitrogen was present as protein nitrogen, about 2.04% of the nitrogen was present as amino acid nitrogen and about 45.2% of the nitrogen was present as peptone nitrogen. This product readily dissolved in cold water to produce a solution having a pH of 4.6.

*Example IV*

The procedure and materials employed in this example were the same as those employed in the preceding examples, except that only 1 part of papain was employed for each 1200 parts of gelatin and the non-jelling stage was reached in about 378 minutes. 71 parts of gelatin yielded 69 parts of a solid material containing 5.80% water and 16.64% nitrogen. The nitrogen was divided—8.86 parts as proteose nitrogen, 0.07 part as protein nitrogen, 0.41 parts as amino acid nitrogen and 7.3 parts as peptone nitrogen. In other words, about 53.1% of the nitrogen was present as proteose nitrogen, about 0.42% of the nitrogen was present as protein nitrogen, about 2.46% of the nitrogen was present as amino acid nitrogen and about 43.8% of the nitrogen was present as peptone nitrogen. When this material was dissolved in water, it produced a solution having a pH of 4.63.

*Example V*

A purified papain solution, prepared as in Example I but having a pH of 5.5, was added to a 32% solution of gelatin in water in the ratio of 1 part of papain to 150 parts of gelatin at 140° F., and this temperature maintained for 35 minutes. The resulting solution was evaporated to dryness in vacuo without filtration or decolorization since such treatment appeared to be unnecessary. The original gelatin was derived from ossein and the non-jelling stage was reached in about 30 minutes. The solid product was hard and brittle closely resembling the original gelatin in appearance, but was readily soluble in cold water and had no jelling properties. The product contained 10.51% water and 15.14% nitrogen. The nitrogen was divided—9.50 parts as proteose nitrogen, 0.16 part as protein nitrogen, 0.44 part as amino acid nitrogen and 5.04 parts as peptone nitrogen. In other words, about 62.75% of the nitrogen was present as proteose nitrogen, about 1.06% of the nitrogen was present as protein nitrogen, about 2.90% of the nitrogen was present as amino acid nitrogen and about 33.29% of the nitrogen was present as peptone nitrogen.

*Example VI*

Ten pounds of gelatin were dissolved in 40 parts of water at 130° F., 0.1 pound of commercial papain powder was then added and the mixture heated at 135° F. for 2 hours. The resulting solution was concentrated and dried under 26 inches of vacuum.

It will be understood that the above examples are given for illustrative purposes only and that various modifications and variations may be made therein without departing from the spirit of our invention. While the enzyme employed in the above examples was papain, similar products may be obtained employing bromelin in place of the papain. For example, suitable products within our invention have been obtained by treating concentrated gelatin solutions with pineapple juice solids in the ratio of 0.089 part of pineapple juice solids to 20 parts of gelatin and 2.3 parts of pineapple juice solids to 64 parts of gelatin. Still other modifications and variations of our process, within the description hereinbefore given, will be apparent to those skilled in the art.

The products of our invention are valuable nutrient materials and may be used as supplements to the normal diet. They will normally be consumed by dissolving them in water, fruit juices, vegetable juices and the like in the proportion of 1 part of solid to 3 parts of the liquid. They may have sugar or flavoring or both added, either to the product or to the solution thereof. A representative product of our invention was consumed by a number of persons as a supplement to their regular diet in the amounts of 75 grams per day per person over a period of a month. The product was found to be non-toxic, palatable and readily ingested. It produced no gastric or renal disturbances.

The products of our invention may be incorporated in confections, such as chocolate bars and the like. Also, they may be made into lozenges with a small amount of gelatin and water or in the form of tablets or any other suitable forms commonly employed for other supplementary food products. They may be mixed with other desirable supplementary food products, such as vitamins, yeast and the like.

Our nutrient materials also have meritorious properties when injected intravenously into subjects whose blood serum protein has been decreased below normal. In such use, our products have been found to be anti-coagulant, stable, soluble in isotonic solutions, non-toxic and non-jelling. Those subjects treated with our products do not become allergic to them. Our products, not only do not produce shock, but act as anti-shock materials.

From the preceding disclosure, it will be apparent that we have provided valuable nutrient materials from gelatin, which nutrient materials have many valuable properties not possessed by gelatin and yet have all of the nutrient value of gelatin. Also, we have provided a very simple and economical process for producing valuable nutrient materials.

We claim:

1. The process of preparing a substantially colorless, completely water-soluble, palatable solid nutrient material having no jelling properties from edible animal gelatin which comprises the steps of subjecting a concentrated aqueous solution of the gelatin to the action of an enzyme of the group consisting of papain and bromelin at temperatures of from about 120° F. to about 150° F. until the gelatin loses all of its jelling properties and then, before the percent of the nitrogen, present as proteose nitrogen, is decreased below 12 and the percent of the nitrogen, present as amino acid nitrogen, is increased above 5, terminating the action of the enzyme.

2. The process of preparing a substantially colorless, completely water-soluble, palatable solid nutrient material having no jelling properties from edible animal gelatin which comprises the steps of subjecting a concentrated aqueous solution of the gelatin to the action of an enzyme of the group consisting of papain and bromelin at temperatures of from about 120° F. to about 150° F. until the gelatin loses all of its jelling properties and then, before the percent of the nitrogen, present as proteose nitrogen, is decreased below 12 and the percent of the nitrogen, present as amino acid nitrogen, is increased above 5, terminating the action of the enzyme and finally concentrating the resulting solution under vacuum at temperatures up to 120° F.

3. The process of preparing a substantially colorless, completely water-soluble, palatable solid nutrient material having no jelling properties from edible animal gelatin which comprises the steps of subjecting a concentrated aqueous solution of the gelatin to the action of papain at temperatures of from about 120° F. to about 150° F. until the gelatin loses all of its jelling properties and then, before the percent of the nitrogen, present as proteose nitrogen, is decreased below 12 and the percent of the nitrogen, present as amino acid nitrogen, is increased above 5, terminating the action of the enzyme.

4. The process of preparing a substantially colorless, completely water-soluble, palatable solid nutrient material having no jelling properties from edible animal gelatin which comprises the steps of subjecting a concentrated aqueous solution of the gelatin to the action of papain at temperatures of from about 120° F. to about 150° F. until the gelatin loses all of its jelling properties and then, before the percent of the nitrogen, present as proteose nitrogen, is decreased below 12 and the percent of the nitrogen, present as amino acid nitrogen, is increased above 5, terminating the action of the enzyme and finally concentrating the resulting solution under vacuum at temperatures up to 120° F.

5. The process of preparing a substantially colorless, completely water-soluble, palatable solid nutrient material having no jelling properties from edible animal gelatin which comprises the steps of subjecting a concentrated aqueous solution of the gelatin to the action of papain in the proportion of 1 part of papain to from about 100 to about 1200 parts of gelatin at temperatures of from about 120° F. to about 150° F. until the gelatin loses all of its jelling properties and then, before the percent of the nitrogen, present as proteose nitrogen, is decreased below 12 and the percent of the nitrogen, present as amino acid nitrogen, is increased above 5, terminating the action of the enzyme and finally concentrating the resulting solution under vacuum at temperatures up to 120° F.

6. The process of preparing a substantially colorless, completely water-soluble, palatable solid nutrient material having no jelling properties from edible animal gelatin which comprises the steps of subjecting a concentrated aqueous solution of the gelatin to the action of papain at temperatures of from about 120° F. to about 150° F. until the gelatin loses all of its jelling properties and then, before the percent of the nitrogen, present as proteose nitrogen, is decreased below 12 and the percent of the nitrogen, present as amino acid nitrogen, is increased above 5, treating the solution with decolorizing carbon, adding an inert filter-aid, filtering the solution and finally concentrating the resulting solution under vacuum at temperatures up to 120° F.

THOMAS B. DOWNEY.
HENRY E. WILLIAMS.